US010616242B2

(12) United States Patent
Alp et al.

(10) Patent No.: US 10,616,242 B2
(45) Date of Patent: Apr. 7, 2020

(54) FORWARD AND BACKWARD NIAP MIGRATION OF CERTIFICATE STORES

(71) Applicant: BlackBerry Limited, Waterloo (CA)

(72) Inventors: Maxim Alp, Thornhill (CA); Michael J. Mueller, Oakville (CA); Janseyit Tileubay, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 213 days.

(21) Appl. No.: 15/729,232

(22) Filed: Oct. 10, 2017

(65) Prior Publication Data
US 2019/0109860 A1    Apr. 11, 2019

(51) Int. Cl.
*H04L 29/06* (2006.01)
*H04L 9/32* (2006.01)
*G06F 21/60* (2013.01)
*G06F 21/64* (2013.01)

(52) U.S. Cl.
CPC .......... *H04L 63/123* (2013.01); *G06F 21/602* (2013.01); *G06F 21/64* (2013.01); *H04L 9/3242* (2013.01); *H04L 63/0823* (2013.01)

(58) Field of Classification Search
CPC . H04L 63/123; H04L 63/0823; H04L 9/3242; G06F 21/602; G06F 21/64
See application file for complete search history.

(56) References Cited

U.S. PATENT DOCUMENTS

| | | | | |
|---|---|---|---|---|
| 7,152,108 | B1 * | 12/2006 | Khan | G06F 21/62 709/225 |
| 2004/0111608 | A1 * | 6/2004 | Oom Temudo de Castro | G06F 21/40 713/156 |
| 2006/0036848 | A1 * | 2/2006 | Brown | H04L 9/3263 713/156 |
| 2009/0199279 | A1 * | 8/2009 | Lange | G06F 21/10 726/6 |
| 2012/0060026 | A1 * | 3/2012 | Little | G06Q 10/107 713/156 |
| 2013/0007446 | A1 * | 1/2013 | Adams | H04L 63/0823 713/156 |
| 2013/0212637 | A1 * | 8/2013 | Guccione | H04L 63/102 726/1 |

(Continued)

OTHER PUBLICATIONS

EPO, Extended European Search Report relating to EP application No. 18198173, dated Feb. 20, 2019.

(Continued)

*Primary Examiner* — J. Brant Murphy
(74) *Attorney, Agent, or Firm* — Rowand LLP

(57) ABSTRACT

A method of ensuring compliance of a plurality of certificate stores on a mobile device with a first security policy is disclosed. The method includes: detecting a certificate store migration triggering event; in response to detecting the certificate store migration triggering event, initiating a bulk migration process to migrate each of the plurality of certificate stores to a respective version that is compliant with the first security policy, the bulk migration process proceeding according to a predetermined order of certificate stores; receiving, from a client application resident on the mobile device, a request to access a first certificate store that has yet to be migrated; and executing an out-of-order migration of the first certificate store.

20 Claims, 5 Drawing Sheets

(56) References Cited

U.S. PATENT DOCUMENTS

| | | | |
|---|---|---|---|
| 2013/0219173 A1* | 8/2013 | Ho | G06F 21/33 |
| | | | 713/157 |
| 2014/0040873 A1* | 2/2014 | Goldman | G06F 8/65 |
| | | | 717/168 |
| 2014/0171151 A2* | 6/2014 | Cormier | H04W 8/183 |
| | | | 455/558 |
| 2014/0213217 A1* | 7/2014 | Ho | H04L 63/105 |
| | | | 455/411 |
| 2017/0250827 A1* | 8/2017 | Opschroef | H04L 9/006 |
| 2018/0183580 A1* | 6/2018 | Scarlata | H04L 9/0861 |

OTHER PUBLICATIONS

Anonymous: "Move Certificate to Another Certificate Store", Jun. 17, 2016, XP055554106, Retrieved from the Internet: URL:https://web.archive.org/web/20160617092649/https://www.digicert.com/move-cerificate-to-another-certificate-store.htm, retrieved on Feb. 8, 2019, p. 1, line 2-line 15.

Microsoft: "Certificate Store Migration" retrieved from: https://msdn.microsoft.com/en-us/library/windows/desktop/bbx04781(v=vs.85).aspx on Jul. 27, 2017.

* cited by examiner

FORWARD AND BACKWARD NIAP MIGRATION OF CERTIFICATE STORES

TECHNICAL FIELD

The present disclosure relates to mobile electronic devices and, in particular, to methods of ensuring compliance of data on a mobile device with one or more information technology (IT) policies.

BACKGROUND

Mobile device management (MDM) services facilitate administration of mobile devices within an organization. Various organizations may institute MDM systems to secure emails and corporate documents on devices, enforce corporate policies, segregate corporate data, and manage different types of mobile devices. An MDM solution generally includes a server that handles the administration of managed devices. The server can enforce various policies on MDM users. In particular, IT policies, whether explicitly set by the corporate entity or adopted to satisfy the requirements of national or international IT product security standards, may be imposed on MDM users, requiring the managed devices to comply with the rules and settings outlined in the policies. Timely and comprehensive compliance with IT policies may be important for ensuring security of data in managed mobile devices.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
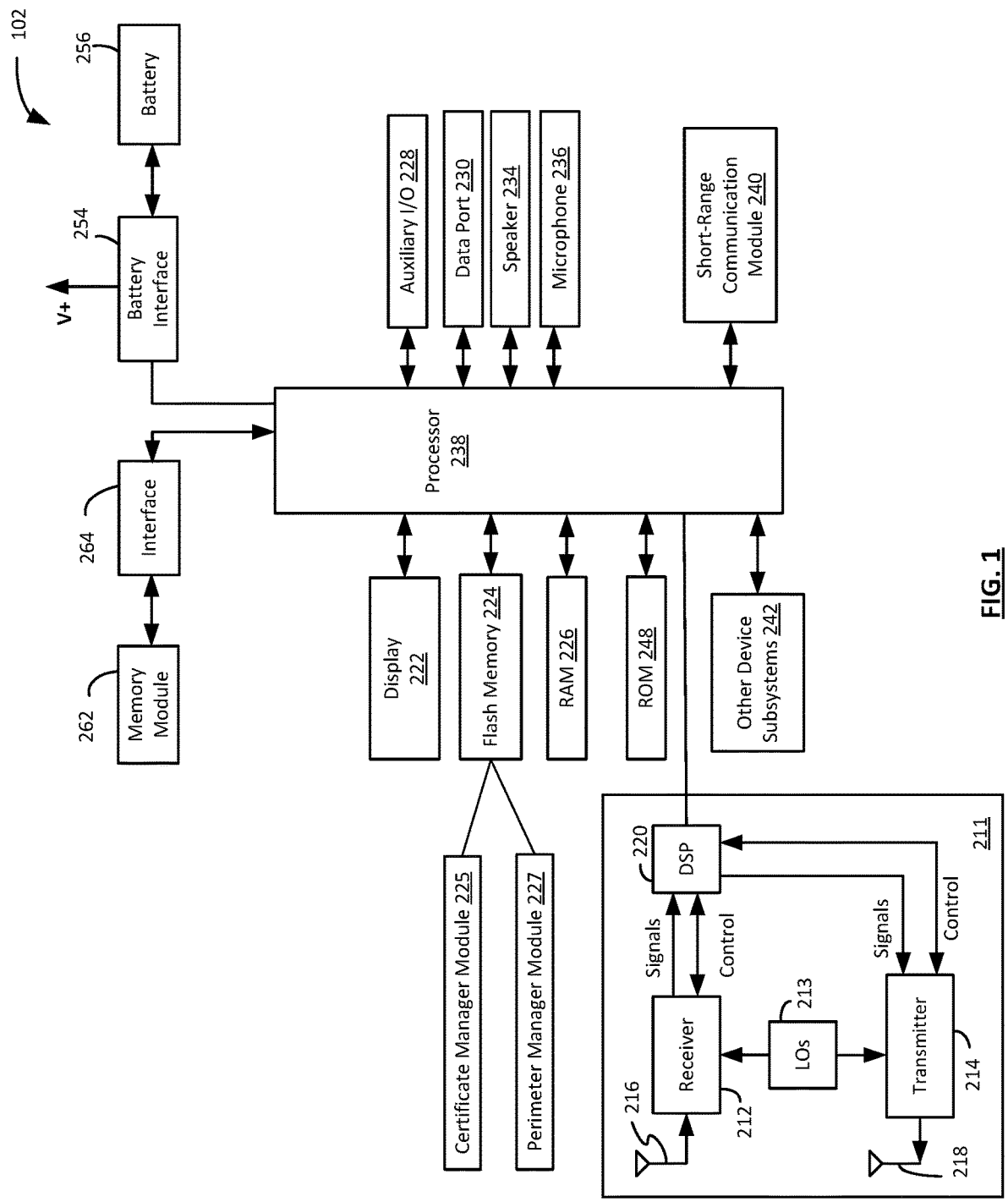
FIG. 1 is a block diagram illustrating components of an example mobile device.

In one aspect, the present disclosure describes a method of ensuring compliance of a plurality of certificate stores on a mobile device with a first information technology (IT) policy. The method includes: detecting a certificate store migration triggering event; in response to detecting the certificate store migration triggering event, initiating a bulk migration process to migrate each of the plurality of certificate stores to a respective version that is compliant with the first IT policy, the bulk migration process proceeding according to a predetermined order of certificate stores; receiving, from a client application resident on the mobile device, a request to access a first certificate store that has yet to be migrated; and executing an out-of-order migration of the first certificate store.

In another aspect, the present disclosure describes a mobile device. The mobile device includes a memory that contains a plurality of certificate stores and a processor coupled to the memory. The processor is configured to: detect a certificate store migration triggering event; in response to detecting the certificate store migration triggering event, initiate a bulk migration process to migrate each of the plurality of certificate stores to a respective version that is compliant with a first IT policy, the bulk migration process proceeding according to a predetermined order of certificate stores; receive, from a client application resident on the mobile device, a request to access a first certificate store that has yet to be migrated; and execute an out-of-order migration of the first certificate store.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "migration" is intended to refer to the process of transferring data (e.g. system files, etc.) between one or more different versions. In particular, an IT policy "migration" of a data object comprises a set of actions that are performed to render the data object compliant with a select IT policy. A "forward" migration of a data object involves accessing and converting the data object to a state of compliance with an IT policy, whereas a "backward" migration involves reversal of the transition steps that were taken to bring the data object to the IT policy compliant state.

The present disclosure provides a mechanism for ensuring compliance of data on a mobile device with one or more information technology (IT) policies. More specifically, the present disclosure describes techniques for performing migration of certificate stores on a mobile device to render the certificate stores compliant with select IT policies. A certificate store is a special key database file that is used to store digital certificates. Certificate stores are generally encrypted and located in different encryption domains within a file system of a mobile device. In particular, the contents of a certificate store are available only when the associated encryption domain is unlocked. As a consequence, the availability of the certificate stores for data migration may vary and can, in some instances, be interrupted. Another challenge for the data migration process is ensuring that the migration itself is resilient to device reboots. That is, even where the individual data migration steps are interrupted by device reboots, the migration is preferably capable of being resumed without breaking the state of migration of the individual certificate stores.

The present disclosure introduces methods for ensuring that certificate stores on a mobile device are maintained to be compliant with select IT policies that are supported within an enterprise device management system. By way of a specific example, the methods of the present disclosure may manage the certificate stores on a mobile device such that they are compliant with security requirements of an IT products testing and validation standard, such as the National Information Assurance Partnership (NIAP) Common Criteria Evaluation and Validation Scheme (CCEVS).

A dual migration scheme for certificate stores, representing a combination of bulk store migration and individual store migration processes, is disclosed. When an IT policy is pushed to a device (for example, by an administrator of an enterprise device management server), the device awaits detection of a migration triggering event. Once a migration triggering event is detected, a bulk migration of certificate stores is initiated, to handle the migration of certificate stores on the device, one at a time. The bulk migration proceeds according to a predetermined order of certificate stores. Before or during the bulk migration process, if a client application that is resident on the device requests or gains access to a first certificate store that has not yet been migrated, an out-of-order migration of the first certificate store is executed. This "on-demand" migration of individual certificate stores allows active certificate stores to be prioritized during the IT policy migration process.

Example Mobile Electronic Device

Referring to FIG. 1, a typical mobile device 102 is illustrated in greater detail. The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a wireless Internet appliance, a smartphone, a table computer, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which the mobile device 102 is intended to operate.

The mobile device 102 includes a processor 238, which controls the general operation of the mobile device 102. The processor 238 can interact with additional device subsystems such as a display 222, a flash memory 224, a random access memory (RAM) 226, a read only memory (ROM) 248, auxiliary input/output (I/O) subsystems 228 (such as a keyboard or trackball, for example), a data port 230, a speaker 234, a microphone 236, a short-range communications subsystem 240 (such as Bluetooth™, for example), and any other device subsystems or peripheral devices generally designated at 242.

Operating system software used by the processor 238 may be stored in a persistent store such as the flash memory 224 (which may be a ROM), a ROM 248 or similar storage element (not shown). The operating system, specific device applications, or parts thereof, may be temporarily loaded into a volatile store such as RAM 226.

The processor 238, in addition to its operating system functions, enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through a wireless communications network, an auxiliary I/O subsystem 228, serial port 230, short-range communications module 240, or any other suitable subsystem 242, and installed by a user in RAM 226, ROM 248 or flash memory 224, for execution by the processor 238. For example, a certificate manager module 225 and a perimeter manager module 227 may be installed on the mobile device 102 to implement aspects of the present disclosure. Such flexibility in application installation increases the functionality of the mobile device 102 and may provide enhanced on-device features, communication-related features, or both.

The short range communication module 240 provides for communication between the electronic device 102 and different systems or devices, which need not necessarily be similar devices. For example, the short range communication module 240 may include an infrared device and associated circuits and components, or a wireless bus protocol compliant communication mechanism such as a Bluetooth® communication module to provide for communication with similarly-enabled systems and devices.

The display 222 is used to visually present an application's graphical user interface (GUI) to the user. The user can manipulate application data by modifying information on the GUI using an auxiliary input/output device 232, such as a keyboard for example. Depending on the type of mobile device 102, the user may have access to other types of input devices, such as, for example, a scroll wheel, trackball, light pen or touch sensitive screen.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the mobile device 102 also includes a removable memory module 262 (typically including flash memory) and a memory module interface 264. Network access may be associated with a subscriber or user of the electronic device 102 via the memory module 262, which may be a Subscriber Identity Module (SIM) card for use in a GSM network or other type of memory module for use in the relevant wireless network type. The memory module 262 may be inserted in or connected to the memory module interface 264 of the electronic device 102.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The mobile device 102 also includes a battery 256 as a power source, which is typically one or more rechargeable batteries that may be charged, for example, through charging circuitry coupled to a battery interface 254 such as the serial data port 230. The battery 256 provides electrical power to at least some of the electrical circuitry in the electronic device 102, and the battery interface 254 provides a mechanical and electrical connection for the battery 256. The battery interface 254 is coupled to a regulator (not shown) which provides power V+ to the circuitry of the electronic device 102.

Modes of Operation of a Managed Mobile Device

In an MDM system, a managed device may be activated to include two or more "perimeters". A perimeter generally refers to a logical separation of resources, such as applications, stored data, and/or network access. A perimeter may, for example, include data, network access resources, applications, configuration files, a policy defining security settings, a combination of the foregoing, or other resources. Resources that are included in a perimeter may be encrypted and password protected in order to securely separate those resources from resources in different perimeters.

In some implementations, each perimeter on a device has its own file system on the device, and separation between perimeters can be provided, at least partially, by the separation of the file systems on the device. Separation of file systems can be logical (e.g. logically separate data structures), physical (e.g. separate blocks in memory), or both.

Figure 2:
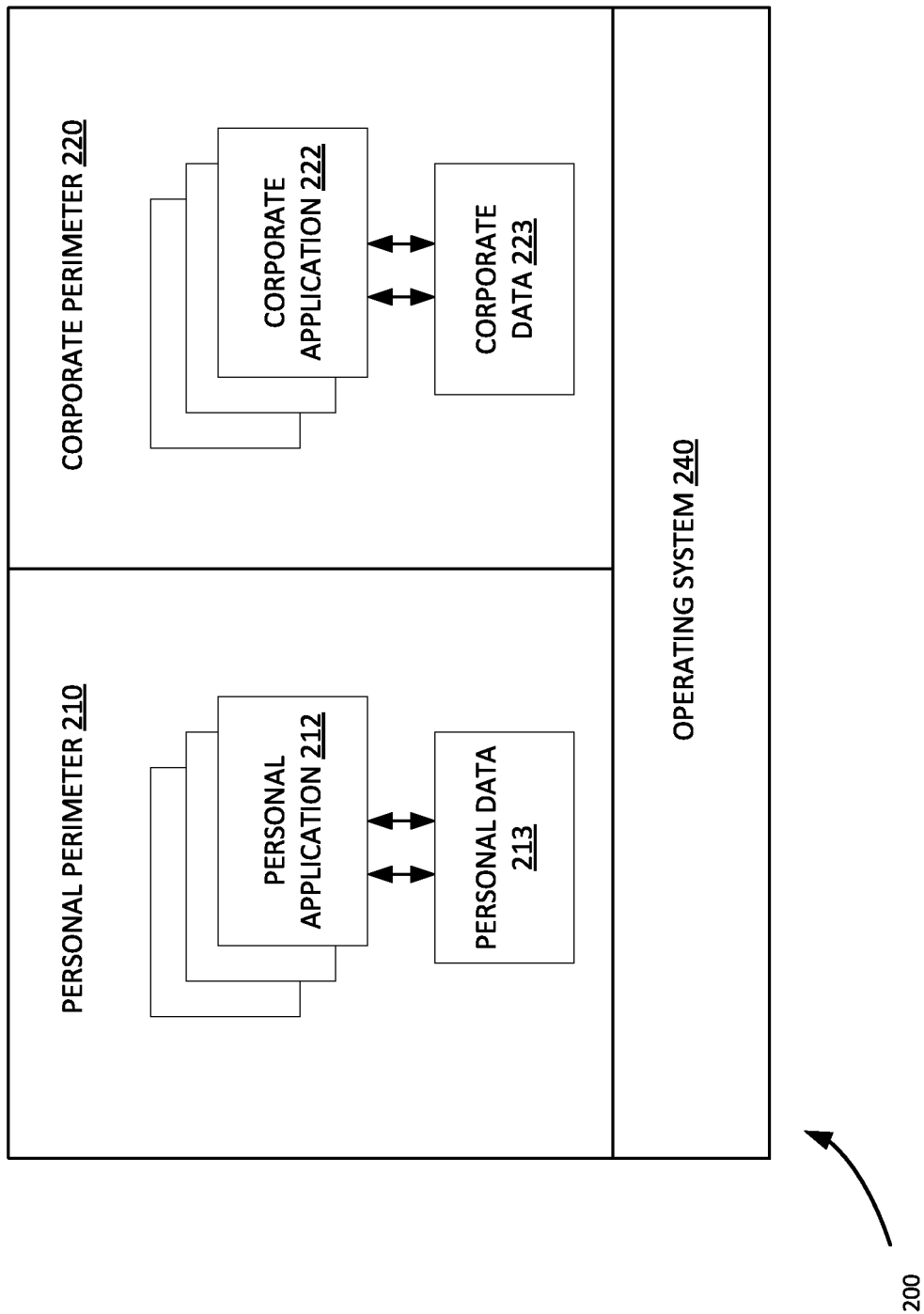
FIG. 2 is a block diagram of an example memory of a mobile device.

In some cases, a mobile device may be activated to include a personal perimeter and a work (or corporate) perimeter. Reference is made to FIG. 2, which shows an exemplary block diagram of a memory 200 of a mobile device. The memory 200 is divided into two perimeters representing a personal perimeter 210 and a work perimeter 220. A personal perimeter is a perimeter that is created for and managed by a user of the mobile device. In contrast, a work perimeter is a perimeter created for or by a user and managed by a remote management server (such as a BlackBerry Enterprise Server (BES)). A personal perimeter may be associated with a personal account on a device, while a work perimeter may be associated with an enterprise account. This type of device activation offers control of work data on the device while ensuring accessibility and privacy of personal data on the device.

Work perimeter 220 may comprise a portion of memory on the mobile device segregated for resources (data, applications, etc.) which may be considered sensitive to a business, enterprise, government, or any other entity setting an IT policy for the mobile device. The work perimeter 220 may be managed by a remote management server or service, such as a BlackBerry Enterprise Server (BES). Within work perimeter 220, a plurality of work applications 222 can communicate with data that is considered to be work data 223.

Personal perimeter 210 may comprise a portion of memory segregated for personal resources (data, applications, etc.), where personal resources may be considered outside of or separate from those resources that are subject to an IT policy. The personal perimeter 210 may be created by default for a user and managed by the same. Within personal perimeter 210, a plurality of personal applications can communicate with personal data 213.

Segregating work applications/data from personal applications/data on a mobile device allows a corporate IT policy to be implemented on the mobile device to manage and protect the work data, while still providing access to personal resources on the mobile device.

Work (or corporate) data may be treated differently from personal data and applications. In some implementations, content belonging to a work perimeter may be provided with additional security over content in a personal perimeter. For example, all data stored in the work perimeter may be required to be encrypted, even if personal data is not. In some enterprise systems, an advanced data-at-rest encryption model may be implemented to specifically protect work perimeter data. The data-at-rest protection can help to secure sensitive data by restricting access to data objects (e.g. files) in the device's work perimeter. When the work perimeter is locked, only applications that have been specifically developed to support at-rest protection are allowed to continue to run in the work perimeter, and are restricted to accessing only certain parts of the work perimeter file system. Advanced data-at-rest protection may also encrypt data that the device receives when the work perimeter is locked. That is, both the data that is stored in the work perimeter on devices and work data that locked devices receive may be encrypted. The work data may be encrypted using a hierarchy of encryption keys including a file encryption key, a work domain key, a work master key, and a system master key.

Data that is stored in the work perimeter may be encrypted and only become accessible while the work perimeter is "unlocked". In the "unlocked" state of a perimeter, all operations to files in a file system domain may be permitted. In order to unlock a perimeter, the user of the device may be prompted for a password. When the user is validated, the underlying file system domain may be unlocked, and the state of the domain may change to unlocked. The work perimeter may be unlocked, for example, when a user unlocks the device or authenticates to switch from a personal perimeter to the work perimeter.

The contents of a work perimeter may be divided into multiple encryption domains. A domain can contain any number of files or directories. After a domain is assigned to a directory, files that are subsequently created in that directory are encrypted and inherit that domain. During operation, files that are assigned to a domain are encrypted, and the files' contents are available only when the associated domain is unlocked. When a domain is unlocked, the files and directories under that domain are unlocked as well, and therefore become accessible. When a domain is locked, any access to file content belonging to that domain is denied.

Certificate Stores on a Mobile Device

A (digital) certificate is a document issued by a trusted party, such as a certificate authority (CA), which verifies the identity of a certificate subject and binds the identity to a public key. The certificate includes information about the key, the identity of the subject, and a digital signature of the issuer of the certificate. Each certificate has a corresponding private key. The public key and private key pair can be used for data encryption and identity authentication. For example, certificates can be used by a device for: authentication with an SSL or TLS server when connecting to web pages that use HTTPS; authentication with a work mail server; configuring a virtual private network (VPN) connection; and encrypting and signing email message using S/MIME protection.

Certificates that are used for various different purposes can be stored on a device. For example, when a device requires a public key associated with the source of a communication for authentication purposes, the device may review a local key store. If the public key cannot be located in the local key store, the device may seek to import a certificate associated with the source of the communication. The device may, for example, obtain the certificate directly from the source of the communication or from a trusted CA. Upon obtaining the certificate, the processor may save the certificate at the mobile device in a certificate store. In some cases, the enterprise server may provide client certificates to one or more managed devices. For example, certificates may be sent directly to devices during device activation, or provided through profiles (e.g. CA certificate profile, user credential profile, etc.) that devices can use to get client certificates from the enterprise's CA.

The certificates obtained by a device are stored in certificate stores. A certificate store is a dedicated storage area in a device's memory for storing certificates. Certificates may be stored in the certificate store in the format in which they were received, or may alternatively be parsed or otherwise converted to a storage format before being written to the certificate store. If a certificate (e.g. CA certificate) is sent by an enterprise server to a managed device, the server may specify which certificate store to send the certificate to on the device. For example, based on the purpose of a certificate, the certificate may be sent to a browser certificate store, a VPN certificate store, a Wi-Fi certificate store, or an enterprise certificate store. The certificate stores and the certificates stored therein may, in turn, belong to different encryption domains.

Figure 3:
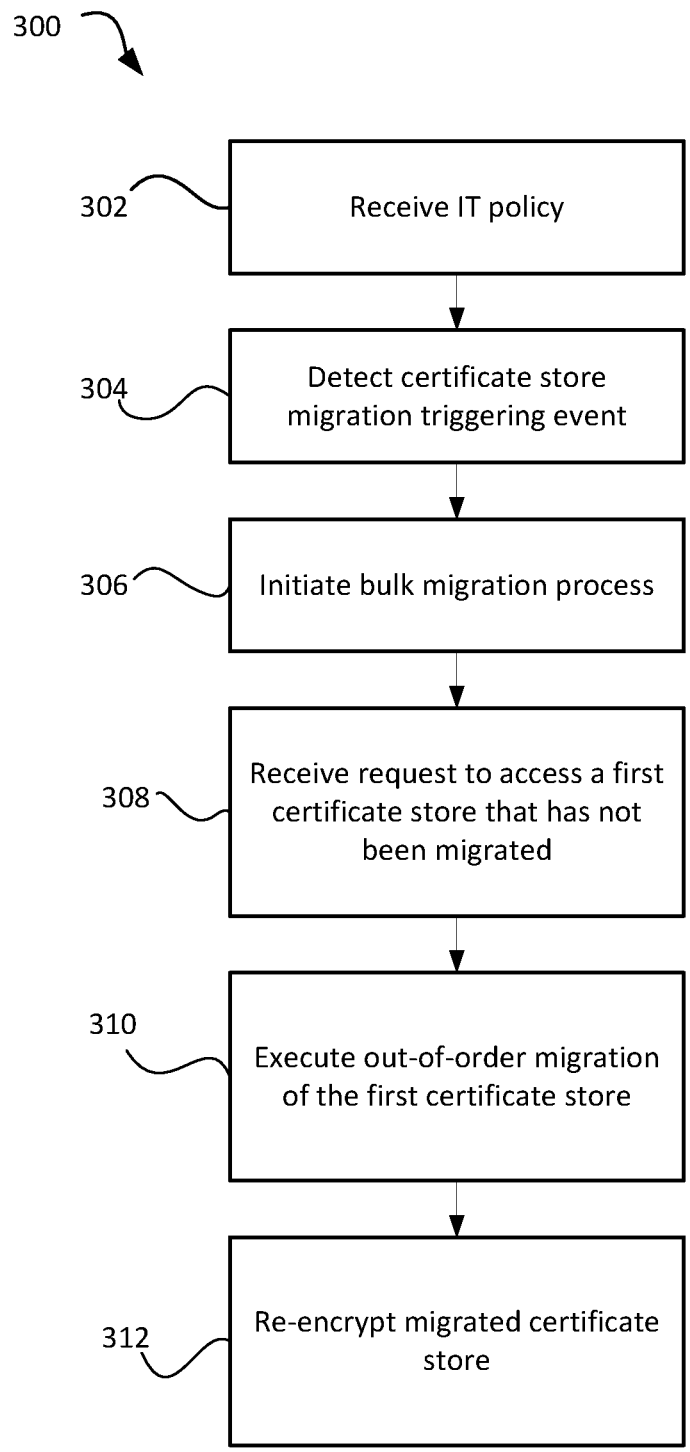
FIG. 3 is a flowchart illustrating an example method of performing a forward IT policy migration of a plurality of certificate stores in accordance with example embodiments of the present disclosure.

Reference is now made to FIG. 3, which shows, in flowchart form, an example method 300 for ensuring compliance of a plurality of certificate stores with an IT policy. In at least some embodiments, the method 300 is implemented by a mobile device that is managed by an enterprise server and/or an administrator of an MDM service. More specifically, the method 300 may be implemented by a certificate manager of a managed mobile device, such as certificate manager module 225 of FIG. 1, in conjunction with the processor of the device.

An enterprise server may use IT policies to manage the security and behavior of devices in the enterprise. An IT policy may include a set of rules and settings that control the functionalities on devices. The operating environment (i.e. OS) and device activation type can determine which rules in an IT policy are suitable to be applied to a particular device. IT policy rules can be used to, for example, restrict or allow certain device capabilities, enforce password requirements, manage access to device resources, and control the behavior of the device when operating in different perimeters.

An IT policy may be explicitly set by an organization for the devices that are managed within the organization. Additionally or alternatively, an IT policy may be guided by the requirements of one or more standards for IT security, such as the Common Criteria for Information Technology Security Evaluation (or "Common Criteria"). The Common Criteria is a framework through which users can specify their product security requirements, vendors can implement and/or make claims about the security attributes of their products, and testing laboratories evaluate the products to verify the claimed security assurance of the products. The National Information Assurance Partnership (NIAP), a United States government initiative operated by the National Security Agency to meet the security testing needs of IT consumers and producers, administers its own scheme (Common Criteria Evaluation and Validation Scheme, or CCEVS) for evaluating the security functionality of an IT with conformance to the Common Criteria international standard. If, at the conclusion of an evaluation, an IT product is found to satisfy all the assurance requirements of a defined protection profile, the NIAP issues a certificate validating the product's evaluation and publicly recognizes the product as NIAP-compliant. An NIAP certification may serve to increase the level of trust consumers have in their IT systems and networks, and can be an important tool for raising the appeal of security-focused IT products.

The methods described in the present disclosure provide a mechanism for performing migration of certificate stores to enforce compliance with various IT policies in an enterprise setting. The features of example method 300 will now be described. In operation 302, a device receives an IT policy (e.g. NIAP IT policy) that is pushed by an enterprise server administering the device. The IT policy may, for example, comprise standards and rules that the device may be required to adhere to. In some embodiments, the IT policy may include various parameters, such as version number, urgency of compliance, etc. as well as historical data relating to previous updates of the policy.

In operation 304, the device detects a certificate store migration triggering event. In at least some embodiments, detecting the certificate store migration triggering event may comprise detecting that all of the plurality of certificate stores on the device are concurrently accessible. For example, where the certificate stores are located in multiple different encryption domains within a work perimeter of the device, detecting that all of the certificate stores are concurrently accessible may involve detecting that the work perimeter is unlocked (e.g. the data objects in each of the encryption domains are decrypted). In some cases, the work perimeter may be unlocked when a user unlocks the device itself, while in other cases, the device and the work perimeter may have to be independently unlocked.

In response to detecting a certificate store migration triggering event, in operation 306, the device initiates a bulk migration process to migrate each of the plurality of certificate stores to a respective version that is compliant with the IT policy. The bulk migration handles the certificate stores one at a time, accessing each certificate store and converting the certificate store to an NIAP-compliant state. The bulk migration process proceeds according to a predetermined order of certificate stores. For example, the received IT policy or device settings may specify an order in which to convert the certificate stores on a device. The order of migration of the certificate stores during the bulk migration process may depend, at least in part, on such factors as date of last access of store, frequency of access of store, number of certificates in the store, type and/or purpose of the certificates in the store, etc.

The actions involved in converting a certificate store into a state that is compliant with a particular IT policy depends on the specific requirements of said policy. For example, migrating a certificate store to be compliant with an IT policy may involve encrypting the certificate store (or the certificates in the certificate store) with a specific encryption algorithm that is designated by the IT policy. As another example, migrating a certificate store may involve updating the rules and requirements for accessing the contents of the certificate store. As yet another example, migrating a certificate store may require changing various properties (e.g. size, capacity, etc.) of the certificate store and/or certificates contained therein. Notably, the migration operation is idempotent—that is, the operation can be applied multiple times to a certificate store without changing the result beyond the initial application. In particular, if a certificate store is subjected to the store migration process more than once, the resultant certificate store will be the same as after the first instance of the migration operation on the certificate store. In some embodiments, to enforce the immutability of a certificate store after the initial migration, a hash check may be executed, for example, by hashing the file contents of the certificate store and checking against a database to ensure the certificate store has not changed. A hash may be computed, for example, on the certificate store itself, an encryption key associated with the certificate store, or a size of the encryption key.

In operation 308, the device receives, from a client application resident on the device, a request to access a first certificate store that has yet to be migrated for compliance with the IT policy. Upon receiving the request, the device executes an out-of-order migration of the first certificate store, in operation 310. That is, if a client application on the device gains or attempts to gain access to the contents of a first certificate store before it is migrated via the bulk migration process, an on-demand migration of the first certificate store will be executed. As a result, the migration of the first certificate store is advanced ahead of other yet-to-be migrated certificate stores in the bulk migration process. For example, an index corresponding to the first certificate store in the predetermined order of the bulk migration may be changed such that the first certificate store becomes next in line to be migrated. Alternatively, the bulk migration process may be temporarily halted (i.e. migration of a "current" certificate store is paused) to immediately initiate migration of the first certificate store. The on-demand migration therefore prioritizes migration of the first certificate store when converting the certificate stores of the device to IT policy compliant state. According to this approach, "active" certificate stores may be migrated earlier than non-active certificate stores, which may provide updated security protection for those data objects (e.g. certificates, certificate stores, etc.) that are accessed and/or used most recently or frequently.

In operation 310, the migrated certificate stores are re-encrypted. For example, each migrated certificate store may be encrypted using an encryption key, such as a hardware-based key.

Figure 4:
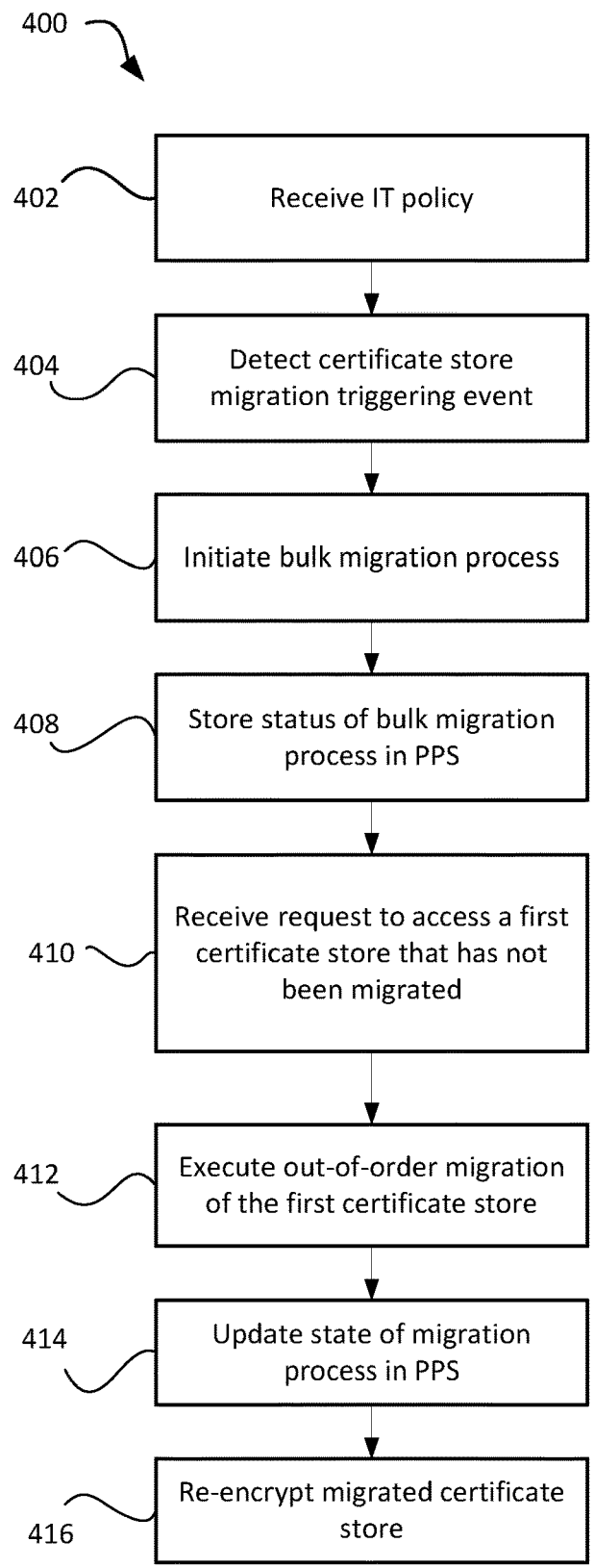
FIG. 4 is a flowchart illustrating another example method of performing a forward IT policy migration of a plurality of certificate stores in accordance with example embodiments of the present disclosure.

Reference is now made to FIG. 4, which shows, in flowchart form, another example method 400 for ensuring compliance of a plurality of certificate stores with an IT policy. In at least some embodiments, the method 300 is implemented by a mobile device that is managed by an enterprise server and/or an administrator of an MDM service. More specifically, the method 300 may be implemented by a certificate manager of a managed mobile device, such as certificate manager module 225 of FIG. 1, in conjunction with the processor of the device.

Operations 402, 404, 406, 410, 412 and 416 correspond to operations 302, 304, 306, 308, 310 and 312, respectively, of method 300. In method 400, a persistent publish-and-subscribe (PPS) service is implemented, in order to maintain an indicator of a current status of the certificate migration process that persists across device reboots. A PPS service allows a process (i.e. a publisher) to publish data to a file (e.g. an object file) that can be read by one or more permitted subscribers. The permitted subscribers may be processes or applications operating or running on the same device as the publisher. PPS maintains its objects (PPS objects) in memory while it is running. In particular, PPS saves its objects to persistent storage, either on demand or at shutdown, and restores its objects on startup (either immediately or on first access). A publisher can send or publish data to a PPS object such that data sent to the PPS object is broadcast or becomes accessible to one or more permitted subscribers. Specifically, a publisher can modify various properties (or attributes) of a PPS object. Clients that subscribe to the object can then receive updates when the object changes. In the context of method 400, a PPS object corresponding to the bulk migration process may be instantiated on the device, with the certificate manager of the device modifying attributes of said object. For example, the PPS object may include attributes such as (1) current status of bulk migration and (2) most recently migrated certificate store. As the bulk migration process progresses, the certificate manager (i.e. publisher) can update the PPS object attributes, such that subscribers to the object (e.g. client applications on the device) can ascertain, for example, the status of migration of a particular certificate store.

Thus, in operation 408, the device stores the current status of the bulk migration process in a persistent storage on the device. In particular, the device may generate, via a PPS service, an object file corresponding to the bulk migration process, the object file having an attribute associated with the current status of the bulk migration. Upon detecting completion of the bulk migration process, in operation 414, the device (i.e. certificate manager) publishes a change to the PPS object file by updating the attribute corresponding to the migration status.

Figure 5:
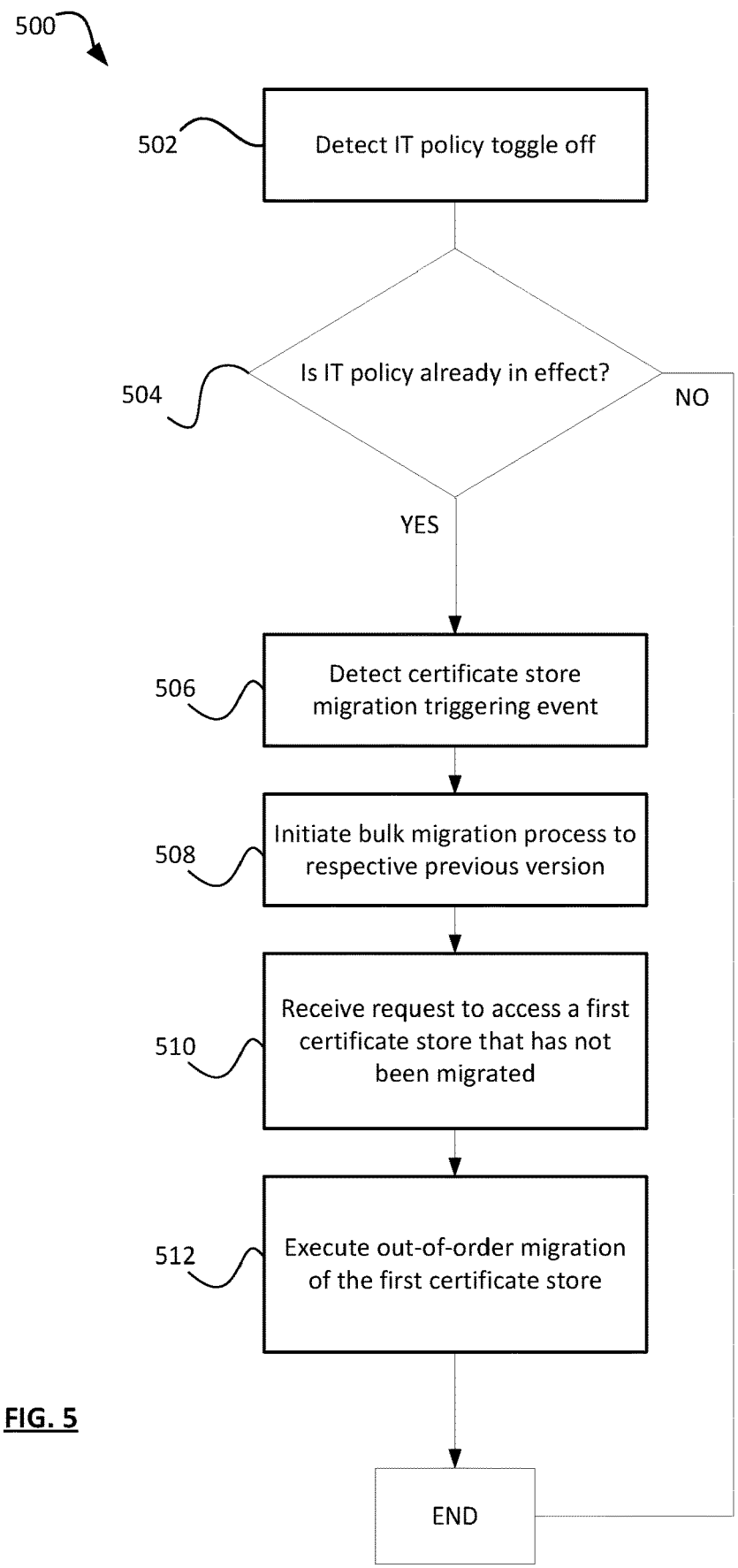
FIG. 5 is a flowchart illustrating an example method of performing a backward IT policy migration of a plurality of certificate stores in accordance with example embodiments of the present disclosure.

Reference is now made to FIG. 5, which shows, in flowchart form, another example method 500 for ensuring compliance of a plurality of certificate stores with an IT policy. In at least some embodiments, the method 300 is implemented by a mobile device that is managed by an enterprise server and/or an administrator of an MDM service. More specifically, the method 300 may be implemented by a certificate manager of a managed mobile device, such as certificate manager module 225 of FIG. 1, in conjunction with the processor of the device.

In some cases, it may be desirable to have the flexibility to toggle between states of compliance and non-compliance with an IT policy for a device. When a device is in compliance with a particular IT security policy, various capabilities of a device may be limited or prevented all together (e.g. limits on resource accessibility, network connectivity, device functionalities, etc.). Moreover, maintaining a state of compliance with a specific policy may require a commitment of device resources that is in excess of the requirement for a state of non-compliance. Having the option to turn an IT policy on or off for a device may offer device users increased flexibility and improved user experience.

In operation 502, an instruction to toggle off a particular IT policy is detected. The device then checks, in operation 504, whether said IT policy is already in effect, i.e. certificate stores have previously been converted to be compliant with the IT policy (or a previous version of the IT policy). If it is determined that the IT policy is in effect, the device proceeds to reverse the changes that were effected to bring the certificate stores in compliance with the IT policy. For example, the device may access a database containing details of any previous policies to select a version to revert to or, if there are no such previous policies, determine that previous states of the certificate stores can be obtained by undoing the modifications that were required by the IT policy.

Operations 506, 508, 510, and 512 correspond to operations 304, 306, 308 and 310, respectively. In particular, the device determines a suitable time at which the backward migration of the certificate stores can be started (i.e. by detecting certificate store migration triggering event) and initiates a bulk backward migration to respective previous versions of the certificate stores. When the device detects, in operation 510, that a client application requests access to a first certificate store that has not been reverted back to its previous state, an out-of-order backward migration of the first certificate store can be executed in operation 512.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer-implemented method of ensuring compliance of a plurality of certificate stores on a mobile device with a first information technology (IT) policy, the method comprising:
   detecting a certificate store migration triggering event;
   in response to detecting the certificate store migration triggering event, initiating a bulk migration process to migrate each of the plurality of certificate stores to a respective version that is compliant with the first IT policy, the bulk migration process proceeding according to a predetermined order of certificate stores;
   receiving, from a client application resident on the mobile device, a request to access a first certificate store that has yet to be migrated; and
   executing an out-of-order migration of the first certificate store.

2. The method of claim 1, wherein detecting the certificate store migration triggering event comprises detecting that all of the plurality of certificate stores are concurrently accessible.

3. The method of claim 2, wherein the plurality of certificate stores are located in multiple different encryption domains within a work perimeter of the mobile device and wherein detecting that all of the plurality of certificate stores are concurrently accessible comprises detecting that the work perimeter is unlocked.

4. The method of claim 1, further comprising, for each of the plurality of certificate stores, encrypting the certificate store after its migration.

5. The method of claim 1, wherein executing an out-of-order migration of the first certificate store comprises advancing the migration of the first certificate store over migration of other certificate stores that have yet to be migrated in the bulk migration process.

6. The method of claim 1, wherein migrating a certificate store comprises applying an idempotent operation on the certificate store.

7. The method of claim 6, wherein the operation comprises computation of a hash value of the certificate store.

8. The method of claim 1, further comprising, upon initiating the bulk migration process, storing a status of the bulk migration process in a persistent storage on the mobile device.

9. The method of claim 8, wherein storing a status of the bulk migration process in a persistent storage comprises generating, via a persistent publish and subscribe service, an object file corresponding to the bulk migration process, the object file having a first attribute associated with the status of the bulk migration process.

10. The method of claim 9, further comprising, upon detecting completion of the bulk migration process, publishing a change to the object file by updating the first attribute.

11. A mobile device comprising,
   a memory containing a plurality of certificate stores;
   a processor coupled to the memory, wherein the processor is configured to:
      detect a certificate store migration triggering event;
      in response to detecting the certificate store migration triggering event, initiate a bulk migration process to migrate each of the plurality of certificate stores to a respective version that is compliant with a first IT policy, the bulk migration process proceeding according to a predetermined order of certificate stores;
      receive, from a client application resident on the mobile device, a request to access a first certificate store that has yet to be migrated; and
      execute an out-of-order migration of the first certificate store.

12. The mobile device of claim 11, wherein detecting the certificate store migration triggering event comprises detecting that all of the plurality of certificate stores are simultaneously accessible.

13. The mobile device of claim 12, wherein the plurality of certificate stores are located in multiple different encryption domains within a work perimeter of the mobile device and wherein detecting that all of the plurality of certificate stores are simultaneously accessible comprises detecting that the work perimeter is unlocked.

14. The mobile device of claim 11, wherein the processor is further configured to, for each of the plurality of certificate stores, encrypt the certificate store after its migration.

15. The mobile device of claim 11, wherein executing an out-of-order migration of the first certificate store comprises advancing the migration of the first certificate store over migration of other certificate stores that have yet to be migrated in the bulk migration process.

16. The mobile device of claim 11, wherein migrating a certificate store comprises applying an idempotent operation on the certificate store.

17. The mobile device of claim 16, wherein the operation comprises computation of a hash value of the certificate store.

18. The mobile device of claim 11, wherein the processor is further configured to, upon initiating the bulk migration process, store a status of the bulk migration process in a persistent storage on the mobile device.

19. The mobile device of claim 18, wherein storing a status of the bulk migration process in a persistent storage comprises generating, via a persistent publish and subscribe service, an object file corresponding to the bulk migration process, the object file having a first attribute associated with the status of the bulk migration process.

20. The mobile device of claim 19, wherein the processor is further configured to, upon detecting completion of the bulk migration process, publish a change to the object file by updating the first attribute.

* * * * *